United States Patent
Allais et al.

(10) Patent No.: US 7,456,362 B2
(45) Date of Patent: Nov. 25, 2008

(54) ELECTRICAL BUSHING FOR CONNECTING A SUPERCONDUCTING DEVICE TO A DEVICE LOCATED AT ROOM TEMPERATURE

(75) Inventors: Arnaud Allais, Saint Julien (FR); Georg Balog, Tranby (NO); Nicolas Lallouet, Saint Martin Boulogne (FR)

(73) Assignee: Nexans, Paris (FR)

( * ) Notice: Subject to any disclaimer, the term of this patent is extended or adjusted under 35 U.S.C. 154(b) by 131 days.

(21) Appl. No.: 11/517,938

(22) Filed: Sep. 7, 2006

(65) Prior Publication Data

US 2007/0131450 A1 Jun. 14, 2007

(30) Foreign Application Priority Data

Dec. 13, 2005 (EP) .................................. 05292693

(51) Int. Cl.
*H01R 4/18* (2006.01)

(52) U.S. Cl. .................................. 174/94 R; 174/84 C

(58) Field of Classification Search .............. 174/94 R, 174/84 C, 73.1
See application file for complete search history.

(56) References Cited

U.S. PATENT DOCUMENTS

| 3,404,216 | A | * | 10/1968 | Amann et al. | ............. | 174/84 C |
| 3,596,231 | A | * | 7/1971 | Melton | ........................ | 439/426 |
| 6,818,828 | B2 | * | 11/2004 | Quaggia | .................... | 174/74 R |

* cited by examiner

*Primary Examiner*—Chau N Nguyen
(74) *Attorney, Agent, or Firm*—Sofer & Haroun, LLP

(57) ABSTRACT

An electrical bushing (1) for connecting a superconducting device (2) to a device located at room temperature has an electrical conductor (9) and an insulating layer (10) surrounding the conductor (9). The conductor (9) has a plurality of tubular sections (9a, 9b, 9c), which are made from an electrically conductive material and are electrically connected to one another at their ends, and the tubular sections (9a, 9b, 9c) having an identical outer diameter D and inner diameters d which are different from one another.

5 Claims, 1 Drawing Sheet

ELECTRICAL BUSHING FOR CONNECTING A SUPERCONDUCTING DEVICE TO A DEVICE LOCATED AT ROOM TEMPERATURE

RELATED APPLICATION

This application is related to and claims the benefit of priority from European Patent Application No. 05292693.8, filed on Dec. 13, 2005, the entirety of which is incorporated herein by reference.

DESCRIPTION

1. Field of the Invention

The invention relates to an electrical bushing.

2. Background

Electrical power supply lines for a superconducting device such as a superconducting cable or a superconducting magnet should make it possible to connect the superconducting device, which is located at a temperature in the region of around 70 kelvin, to a device which is located at ambient temperature. The device, which is located at ambient temperature, is generally a power supply system.

Owing to the fact that the superconducting device, referred to below as a superconductor cable, is located at a temperature which is lower than the device located at ambient temperature, referred to below as a power supply system, by approximately 200 kelvin, it is necessary to provide a power supply line between the superconductor cable and the power supply system which produces a connection between the points at different temperature levels and minimizes the heat losses occurring in the process during operation. In this case, the electrical loads owing to the high voltages in the superconductor cable need to be taken into account.

The electrical power supply line comprises a central conductor, which is provided with a layer of insulating material. The conductor, which generally consists of copper, serves the purpose of passing the electrical current of the superconductor cable up to an end termination, which is located at ambient temperature and is connected to the power supply system. The conductor is intended to bring about a temperature transition, over an appropriate length, between the operating temperature of the superconductor cable and the ambient temperature and in the process ensure that the losses owing to thermal conduction over the length of the conductor remain low and evaporation of the cryogenic liquid, which cools the superconducting cable, is avoided. The cross section of the conductor should therefore not be selected to be too large. Meanwhile, a high electrical current may result in thermal losses owing to the Joule effect as a result of the conductor being heated, and for this reason one attempts to increase the cross section of the conductor. This results in two contradicting requirements.

A further technical problem to be solved consists in controlling the distribution of the electrical field which is produced by the high voltage of the conductor, in order to prevent voltage flashovers.

EP 1 283 576 has disclosed an end termination of a superconductor cable from a very low temperature to a substantially higher temperature (room temperature) by means of a bushing, in the case of which a vacuum-insulating and thermally insulating component is provided between the superconducting cable and the device located at ambient temperature (the power supply system), which component is surrounded by the bushing. The component is provided between a flange, which seals off the cryogenic part, and a flange, which seals off the part located at room temperature.

The bushing comprises a tubular component made from stainless steel, fibre-reinforced insulating foils and electrically conducting foils being wound around said tubular component which act as so-called capacitive field control elements. The bushing may have a conical or cylindrical shape, the smaller diameter being located at the end adjacent to the superconducting cable.

OBJECT AND SUMMARY

The present invention is based on the object of providing a bushing for the purpose mentioned initially which reduces the heat losses produced owing to thermal conduction and the resistance losses.

Further advantageous refinements of the invention are given in the dependent claims.

The essential advantages of the invention consist in the fact that a dielectric layer can be applied to a cylindrical surface with the same wall thickness by means of diecasting. As a result, thermomechanical loads are avoided in the event of changes in temperature when the superconducting cable is brought into operation. Owing to the changing cross section of the conductor, optimization is achieved as regards thermal losses and resistance losses.

DETAILED DESCRIPTION

The invention will be explained in more detail with reference to the exemplary embodiments illustrated schematically in FIGS. 1 and 2.

Figure 1:
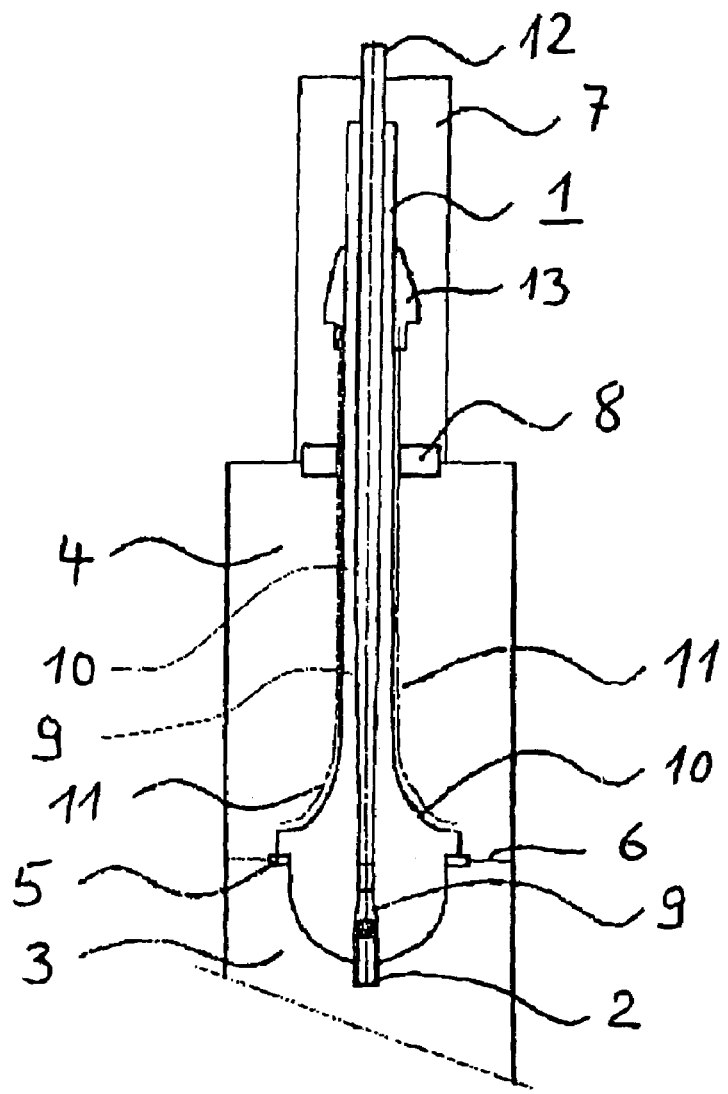
FIG. 1 illustrates an electrical bushing in accordance with one embodiment of the present invention.

FIG. 1 illustrates an exemplary embodiment of an electrical bushing 1 for connecting a superconducting cable 2 to a normal-conducting cable (not illustrated). The connection to the superconducting cable 2 is located in a housing 3, in which there is a temperature in the region of 70 kelvin. A further housing 4, which is connected to the housing 3 via a flange connection 5, is located adjacent to the housing 3. A partition wall 6 separates the interiors of the housings 3 and 4 from one another. The interior of the housing 4 is preferably filled with a solid insulating material, for example polyurethane foam or a foamed glass material.

A further housing 7 is also located above the housing 4, ambient temperature prevailing in said further housing 7. The housing 4 is partitioned off from the housing 7 by an impervious partition wall 8.

The temperature prevailing in the housing 4 is between the cryogenic temperature in the housing 3 and the ambient temperature in the housing 7. The outer walls of the housings 3 and 4 form a cryostat for effective thermal insulation.

The bushing 1 has a central conductor 9, which is provided with an insulating layer 10. Furthermore, a field control layer 11 is also provided on the insulating layer 10 and extends at least over part of the insulating layer 10. A connection 12 is provided at the upper end of the bushing 1 for the purpose of connecting the bushing 1 and thus the superconductor cable 2 to an electrical power supply system or a suitable device.

The field control layer 11 comprises a layer made from zinc or another conductive material which adheres to the outer surface of the insulating layer 10. The field control layer 11 is preferably applied in the form of a varnish coating. The insulating layer 10 consists of a thermoplastic or crosslinked material based on polyethylene or polypropylene. The insulating layer 10 may, however, also consist of epoxy resin. The field control layer 11 is connected to a field control cone 13 known in high-voltage engineering.

Figure 2:
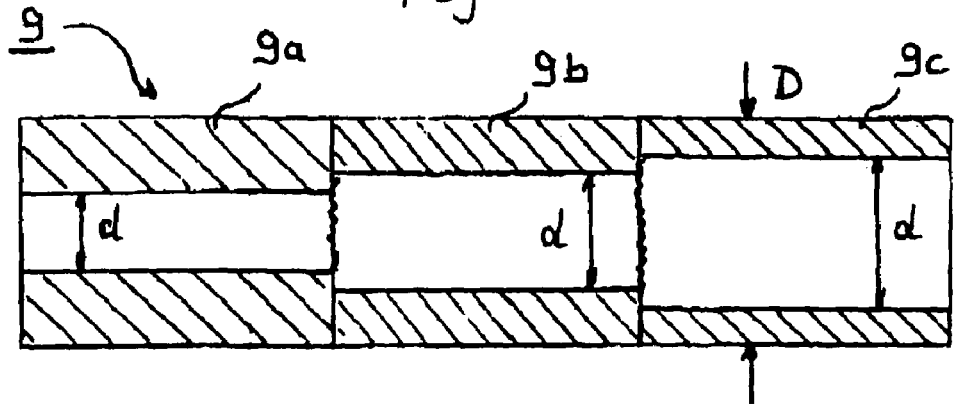
FIG. 2 illustrates a conductor in accordance with one embodiment of the present invention.

FIG. 2 illustrates the conductor 9 and a section thereof, in section. The conductor 9 is in the form of a tubular component. It comprises a plurality of tubular sections 9a, 9b and 9c, which are connected to one another at their end faces by means of welding or soldering. The sections 9a, 9b and 9c have an identical outer diameter D, but their inner diameters d are different and increase from 9a, through 9b, to 9c. The section 9a is connected to the power supply system or a normal-conducting cable, and the section 9c is connected to the conductor of the superconductor cable 2.

In the case of the bushing 1, the temperature of the conductor 9 changes during operation from the cryogenic temperature (approx. 70 kelvin) at the connection between the section 9c and the conductor of the superconductor cable 2 up to the ambient temperature at the connection point 12 between the section 9a and the power supply system. The electrical resistance of the conductor 9 is reduced as its temperature is reduced. It is therefore advantageous to reduce the cross section of the conductor 9 in the region of the low temperature in order, in this manner, to limit the flow of heat over the length of the conductor 9 between the region of the cryogenic temperature and the ambient temperature and to keep the thermal losses, which are brought about by the heating of the conductor 9 owing to the Joule effect, at a low level.

The invention claimed is:

1. Electrical bushing for connecting a superconducting device to a device located at room temperature comprising:
    an electrical conductor; and
    an insulating layer surrounding the conductor, wherein the conductor has a plurality of tubular sections which are made from an electrically conductive material and are electrically connected to one another at their ends, the tubular sections having an identical outer diameter D and inner diameters d which are different from one another,
    and wherein the conductor acts as a connecting piece between the conductor of a superconductive cable and a power supply system with the conductor of the superconductive cable being connected to the section having the largest inner diameter, and the section having the smallest inner diameter is connected to the power supply system.

2. Electrical bushing according to claim 1, wherein the sections are connected to one another at their ends by means of soldering or welding.

3. Electrical bushing according to claim 1, wherein the electrical insulation is a thermoplastic or crosslinked polymer.

4. Electrical bushing according to claim 1, wherein the insulation is epoxy resin.

5. Electrical bushing according to claim 1, wherein an electrically conducting field control layer is arranged on the insulating layer.

* * * * *